(12) United States Patent
King et al.

(10) Patent No.: US 6,688,816 B1
(45) Date of Patent: Feb. 10, 2004

(54) GROOVING AND TURNING INSERT

(75) Inventors: Ken King, Fort Wayne, IN (US); Doug DeWitt, Columbia City, IN (US); Jeff Frank, Fort Wayne, IN (US); Dave Coleman, Spencerville, IN (US); Joshua Hyde, Fort Wayne, IN (US)

(73) Assignee: Kaiser Tool Company, Inc., Fort Wayne, IN (US)

( * ) Notice: Subject to any disclaimer, the term of this patent is extended or adjusted under 35 U.S.C. 154(b) by 0 days.

(21) Appl. No.: 10/218,921

(22) Filed: Aug. 14, 2002

(51) Int. Cl.[7] .............................. B23B 27/04; B23P 15/28
(52) U.S. Cl. ........................................ 407/102; 407/117
(58) Field of Search ............................... 407/101, 102, 407/107, 113, 117

(56) References Cited

U.S. PATENT DOCUMENTS

| | | |
|---|---|---|
| 3,296,683 A | 1/1967 | Kaiser |
| 3,821,837 A * | 7/1974 | Faber .......................... 407/40 |
| 4,509,886 A * | 4/1985 | Lindsay ...................... 407/102 |
| 4,669,924 A * | 6/1987 | Benson ....................... 407/113 |
| 4,832,541 A | 5/1989 | Noguchi et al. |
| 4,973,204 A | 11/1990 | Mihic |
| 5,076,738 A | 12/1991 | Pano et al. |
| 5,382,119 A * | 1/1995 | Mihic .......................... 407/116 |
| 5,638,728 A | 6/1997 | Smith et al. |
| 5,676,495 A * | 10/1997 | Katbi et al. ................. 407/114 |
| 5,833,403 A * | 11/1998 | Barazani ..................... 407/101 |
| 6,000,885 A * | 12/1999 | Erickson ..................... 407/113 |
| 6,033,158 A | 3/2000 | Fountaine |

* cited by examiner

*Primary Examiner*—A. L. Wellington
*Assistant Examiner*—Brian D. Walsh
(74) *Attorney, Agent, or Firm*—Welsh & Katz, Ltd.

(57) ABSTRACT

Small size insert and insert-blank apparatus for machine tools for grooving and turning have a body with generally parallel and opposite sides, and top and bottom surfaces which have at least a portion thereof inclined from adjacent a first end to the opposite end. The body of the apparatus is adapted to be mounted in a toolholder having a nest or pocket having an inclined bottom wall which cooperates with the inclined portion of the bottom surface of the apparatus, and a clamp secured to the toolholder having a finger portion cooperative with the inclined portion of the top surface of the apparatus to resist forces on the apparatus during turning.

31 Claims, 4 Drawing Sheets

GROOVING AND TURNING INSERT

BACKGROUND OF THE INVENTION

1. Field of the Invention

The present invention relates to cutting tools, namely inserts for machine tools, and more particularly, to small size inserts for grooving and turning.

2. Description of Related Art

The art of cutting grooves in a workpiece using a cutting tool, and particularly using an insert secured in a toolholder is well known. The use of an insert in a toolholder for turning, i.e., removing portions of material from a rotating workpiece by causing the insert to traverse along a portion of the longitudinal surface of the workpiece while the insert is sequentially advanced into the surface of the workpiece, is also known.

In one method of securing the insert during its use, particularly for grooving, cutting or threading, the insert is clamped adjacent one side of a toolholder. In this arrangement the toolholder has a nest or pocket formed by a bottom wall and a side wall, and the insert is held in position by a top clamp. Such an arrangement is illustrated in U.S. Pat. No. 3,754,309, issued to Jones et al. on Aug. 28, 1973.

Turning, for example in a lathe, advantageously is performed by traversing and removing material from the workpiece in both longitudinal directions. However, attempts to use the same insert within a holder for both grooving and turning, especially during turning in both directions, presents problems in securely and accurately maintaining the insert in position during these operations. In particular, during turning, and most especially upon the workpiece being traversed in the direction outwardly from that side of the holder to which the insert is clamped, the outward end of the insert held by a clamp to the toolholder tends to slip or rotate sideways due to the lateral force of the workpiece on the outward end of the insert. This is particularly the case where the bottom insert supporting surface of the holder is planar and perpendicular to the sides as in U.S. Pat. No. 3,754,309. Even where the bottom insert supporting surface of the holder is not planar, but is angled as in U.S. Pat. No. 6,000,885, issued to Erickson on Dec. 14, 1999, the insert tends to slip or rotate from the holder.

Attempts have been made to overcome the tendency of the insert to slip or rotate in the holder due to lateral force on the insert, for example by forming a diagonal notch in the insert and angling the clamp element to engage the notch and by forming recessed angled portions in the top and/or bottom surfaces of the insert, as in U.S. Pat. Nos. 3,754,309 and 6,000,885. However, such attempts have generally been imperfect to counter the force exerted on the insert as explained in U.S. Pat. No. 6,000,885. Furthermore, the attempts to date have not been applicable to small-size inserts. Small-size inserts are inserts having grooving widths in the range of from about 0.004 inch to about 0.150 inch and a body width of approximately 0.155 inch. Due to the small size of these inserts, it is impractical to attempt to form diagonal notches and recessed portions in the shank portion of the insert, particularly where the insert is formed of a material such as carbide or of hardened steel.

Thus, there exists a need for small-sized inserts which are adapted to resist forces exerted on the insert, particularly during turning.

SUMMARY OF THE INVENTION

It is an object of the present invention to provide a small-size insert which is securely held within a holder even when encountering lateral forces which tend to move the insert out of position with respect to the holder.

It is another object of the invention to provide a small-size insert which does not require recesses or notches in order to be securely held in position during grooving and turning.

It is still another object of this invention to provide a small size insert which can be securely held in position during grooving, cutting, as well as during turning in both directions along the workpiece.

These and other objects and advantages of the present invention will be apparent from the following description.

In accordance with the present invention an apparatus is provided which is adapted for use with a machine tool for grooving and turning. The apparatus comprises a body having first and second sides which are generally parallel and opposite each other, first and second ends, and top and bottom surfaces. The sides and top and bottom surfaces of the apparatus extend from adjacent the first end to the second end. Thus, the first end extends longitudinally beyond the sides and top and bottom surfaces of the body. The top surface has at least a portion thereof extending from adjacent the first end to the second end and is inclined downwardly from the perpendicular of the top end of the first side to the second side. The bottom surface has at least a portion thereof extending from at least adjacent the first end to the second end and is inclined upwardly from the perpendicular of the bottom edge of the first side to the second side. In the present invention, the first end may have generally parallel walls and may have a polygonal cross-section, and is adapted to be formed into an insert portion, for example by grinding into a desired shape of a cutting tool and/or grooving tool end. Alternatively, the first end may be a cutting tool and/or grooving tool end.

The apparatus of the present invention is intended to be utilized with a toolholder having a nest or pocket formed having an inclined bottom wall which is adapted to support the bottom surface of the apparatus of the invention. The apparatus of the present invention is intended to be securely retained in the nest or pocket of the toolholder by means of a lever-type clamp which is secured to the toolholder by means of a fastener, such as a machine screw, and exerts a downward force on the body of the apparatus. The clamp with which the apparatus of the present invention is held in the nest or pocket of the toolholder includes an inclined surface or angled end which cooperates with the inclined portion of the top surface of the apparatus to securely hold the apparatus in position in the toolholder.

Preferably, in the present invention, the top surface of the apparatus has a second portion extending from adjacent the first end to the second end of the apparatus perpendicularly from the top edge of the first side toward the second side. In such preferred arrangement, the inclined portion of the top surface may extend downwardly from the second portion to the second side at an acute angle with respect to second portion of the top surface. In this manner, the entire top surface need not be inclined, reducing the possibility that a burr or high spot on the nest or pocket bottom wall or on the apparatus body bottom surface may prevent the apparatus from firmly and securely being supported by the nest or pocket bottom wall.

Similarly, the bottom surface of the apparatus may have a second portion extending from adjacent the first end to the second end perpendicularly from the bottom edge of the first side toward the second side. In this preferred arrangement, the inclined portion of the bottom surface may extend upwardly from the second portion to the second side at an acute angle with respect to second portion of said bottom surface. As the lever-type clamp only contacts a portion of the top surface of the apparatus, only the corresponding portion of the top surface of the apparatus need be inclined. In this preferred arrangement, the apparatus of the present invention is securely held in position in the toolholder even upon encountering lateral forces during grooving, as heretofore explained.

DESCRIPTION OF THE PREFERRED EMBODIMENTS

Figure 1:
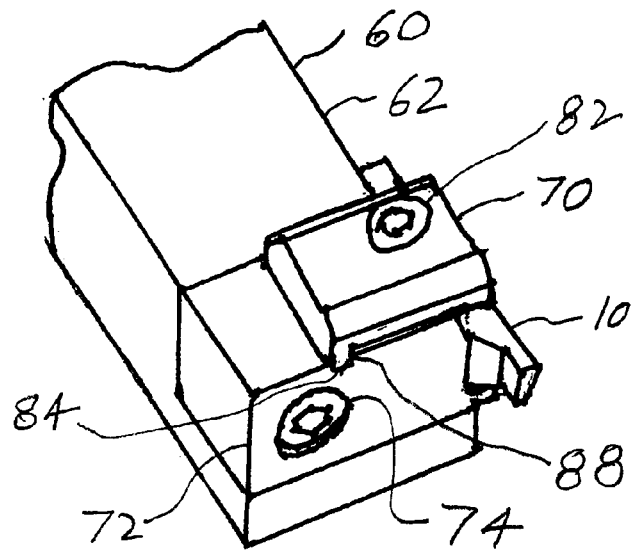
FIG. 1 is a fragmentary perspective view of apparatus in accordance with the present invention mounted and clamped to a toolholder and secured thereto.
Figure 2:
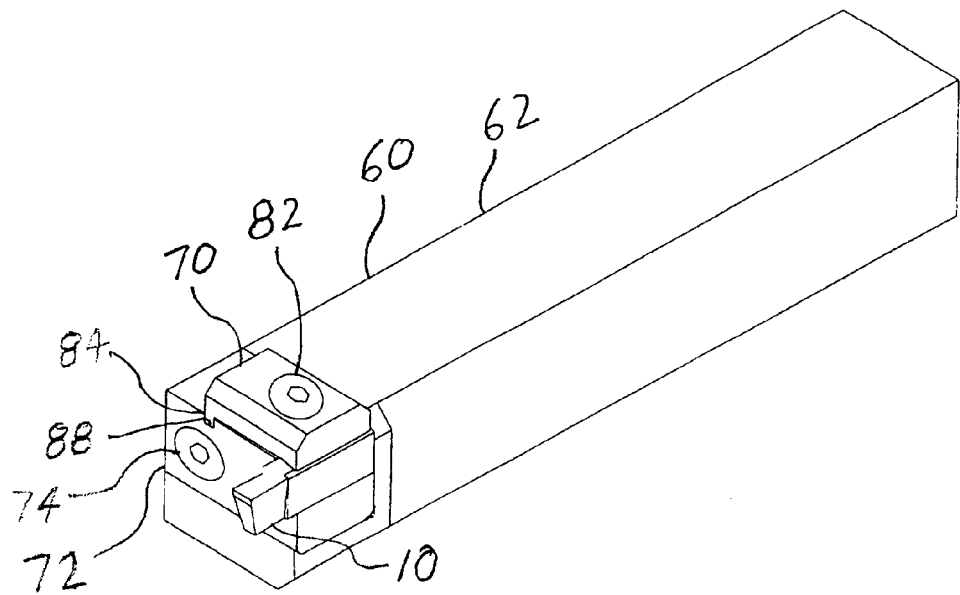
FIG. 2 is another fragmentary perspective view of the apparatus as in FIG. 1 taken from a different orientation.
Figure 3:
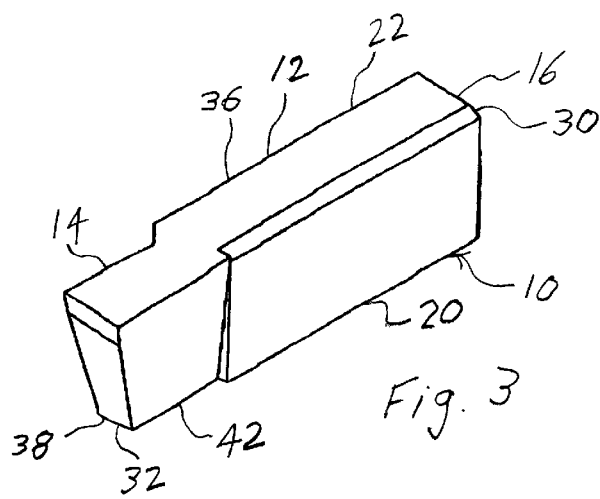
FIG. 3 is a perspective view of an insert in accordance with one embodiment of the present invention.

In a preferred embodiment of the present invention as illustrated in FIGS. 3–6, and as illustrated in FIGS. 1 and 2 mounted to a toolholder, an insert 10 of this invention is provided having a body 12 comprised of a first end 14, a second end 16, a first side 18, a second side 20, a top surface 22 and a bottom surface 24. First end 14 of the apparatus in this preferred embodiment includes the cutting portions of the insert, which are in that portion of the body extending from imaginary lines 26 and 28, respectively, of first side 18 and second side 20. First side 18 and second side 20 of body 12 are generally parallel and opposite each other, and extend from end 14 or from adjacent end 14, i.e., from point or imaginary lines 26 and 28, respectively, to second end 16, as will be hereinafter described.

Top surface 22 of body 12 includes a portion 30 extending from imaginary line 28, i.e. from adjacent first end 14 to second end 16 of body 12, and is inclined downwardly to second side 20 from the perpendicular of the top edge of first side 18 to second side 20. Bottom surface 24 includes a portion 32 extending from the outward end 34 of first end 14 to second end 16 of body 12, and is inclined upwardly to second side 20. Portion 32 may also extend from imaginary line 28 to end 16, but formation of insert 10 is facilitated by forming portion 32 from the outward end 34 of first end 14 to second end 16.

In the preferred embodiment illustrated in FIGS. 3–6, top surface 22 of body 12 includes a second portion 36 extending from the outward end 34 of first end 14 to second end 16 of body 12 perpendicularly from the top edge of first side 18 toward second side 20. Inclined second portion 30 extends from second portion 36, from imaginary line 28 to second end 16, downwardly to second side 20 at an acute angle with respect to second portion 36. Inclined portion 30 does not extend to outward end 34 of first end 14, as extending the inclined portion 30 to end 34 would interfere with the use of the upper corners of end 14 as the cutting portion of insert 10.

Further, in the preferred embodiment illustrated in FIGS. 3–6, bottom surface 24 includes a second portion 38 extending from the outward end 34 of first end 14 to second end 16 of body 12 perpendicularly from the bottom edge of first side 18 toward second side 20. Inclined second portion 32 of bottom surface 24 extends from second portion 38 from outward end 34 of first end 14 to second end 16, upwardly to second side 20 at an acute angle with respect to second portion 38. Inclined portion 32 may extend from imaginary line 28 to end 16, but for facility in forming the insert, it is preferred to form inclined portion 32 so as to extend from outward end 34 of first end 14 to second end 16.

Figure 4:
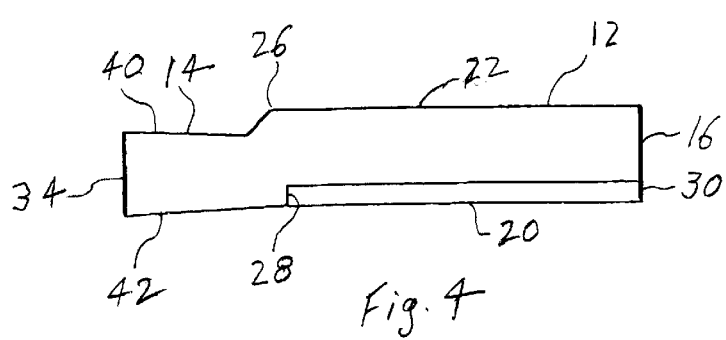
FIG. 4 is a top view of the insert of FIG. 3.
Figure 6:
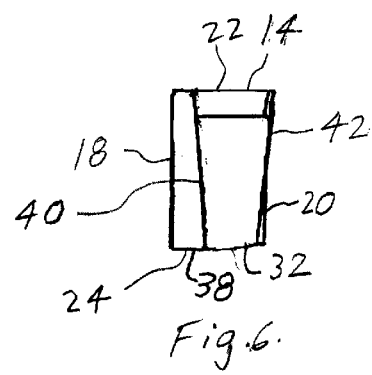
FIG. 6 is a front end view of the insert of FIG. 3.
Figure 5:
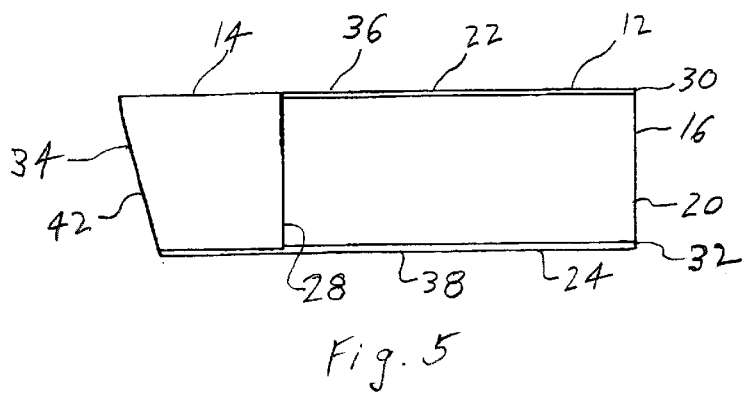
FIG. 5 is a right side view of the insert of FIG. 3.
Figure 7:
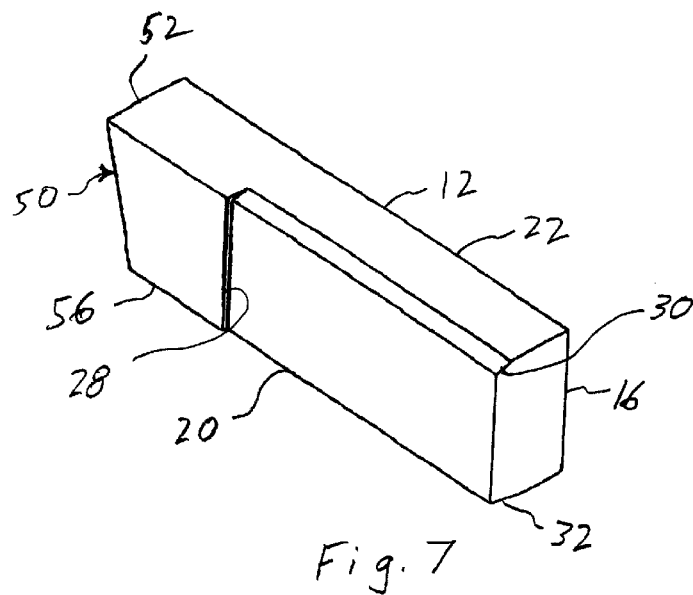
FIG. 7 is a perspective view of a insert-blank in accordance with another embodiment of the present invention.
Figure 10:
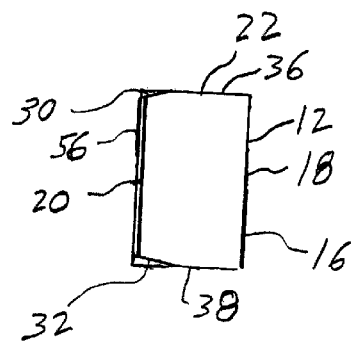
FIG. 10 is a rear end view of the insert-blank of FIG. 7.
Figure 8:
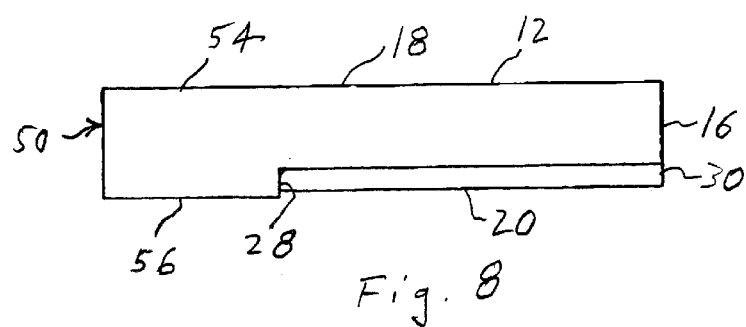
FIG. 8 is a top view of the insert-blank of FIG. 7.
Figure 9:
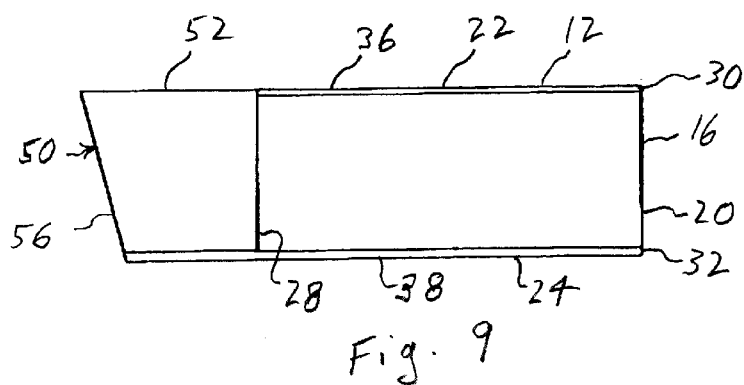
FIG. 9 is a right side view of the insert-blank of FIG. 7.

In the preferred embodiment illustrated in FIGS. 3–6, first end 14 of insert 10 has a generally polygonal cross-section. In addition the side walls 40, 42, extending from sides 18 and 20, respectively, of body 12 to outward end of 34 of end 14 are tapered outwardly, as best shown in FIG. 4, to avoid binding in the workpiece when the insert 10 is used for forming grooves of the thickness of the top of outward end 34 of the insert. In addition, in the preferred embodiment shown in FIGS. 3–6, the side wall 40 of end 14 is offset inwardly from wall 22.

In another preferred embodiment, as shown in FIGS. 7–10, an insert-blank 50 is provided in which the body is identical to the body 12 of the first preferred embodiment described and illustrated therein and is designated with the same numerals, and the description thereof is incorporated herein to avoid repetition.

In insert-blank 50, first end 52 has generally parallel side walls 54, 56 extending from walls 18 and 20, respectively, side wall 54 being co-extensive at its top and bottom with wall 18, while side wall 56 is offside transversely outwardly beyond wall 20. As in the case of inclined portion 32 of insert 10, the inclined portion 32 in this embodiment extends from the outward end 52, although it could extend only from imaginary line 28. Insert-blank 50, and particularly its first end 52, is adapted for being formed into an insert portion, for example, by grinding end 52 into the insert portion or end 14 of the insert 10 illustrated in FIGS. 3–6.

Figure 11:
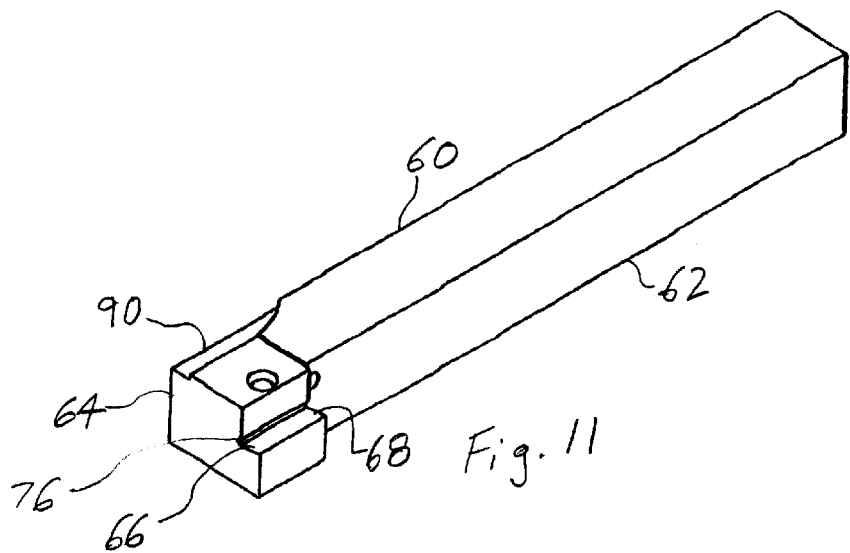
FIG. 11 is a perspective view of a toolholder with which the apparatus of the present invention may be used.
Figure 12:
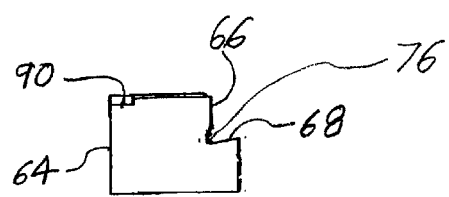
FIG. 12 is a front end view of the toolholder illustrated in FIG. 11.

As illustrated in FIGS. 1 and 2, the apparatus of the present invention is adapted and intended to be secured in a toolholder. As shown in FIGS. 11 and 12, a toolholder 60 with which the apparatus of the present invention may be utilized has a shank 62 and an insert support head 64. The insert support head 64 has an insert support nest or pocket 66 having an inclined bottom wall 68 adapted to receive an inclined bottom surface portion of an insert. The insert can be held therein by a clamp 70, as will be hereinafter described. For example, in the preferred embodiment shown in FIGS. 1 and 2, an insert 10 is secured to a toolholder 60 by a clamp 70, as will be described.

The insert support head 64 of toolholder 60 may be integral with the shank 62, as shown in FIGS. 11 and 12, or may comprise a base integral with shank 62 as shown in FIGS. 1 and 2 supporting a support block 72 which is bolted to shank 62 by means of a machine screw 74. In either case, insert support nest or pocket 66 may have an arcuate cut-out or relief 76 at the junction between inclined bottom wall 68 and the vertical wall forming the nest or pocket 66. The arcuate cut-out or relief 76 helps insure the firm seating of insert 10 within the nest or pocket 66.

As heretofore described, preferably inclined portion 32 of bottom surface 24 is inclined upwardly at an acute angle, from the perpendicular of first side 18, i.e., from portion 38. Moreover, preferably inclined portion 32 is inclined upwardly as stated above at an angle of less than about 30 degrees, and most preferably at an angle of about 10 degrees. The inclined bottom wall 68 of nest or pocket 66 is also inclined upwardly from the horizontal at an acute angle, preferably at approximately the same angle as the inclined portion 32 of the bottom surface 24.

Figure 13:
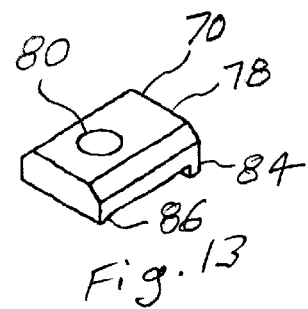
FIG. 13 is a perspective view of a clamp which may be used in cooperation with the toolholder illustrated in FIG. 11 to secure an apparatus of the present invention.
Figure 14:
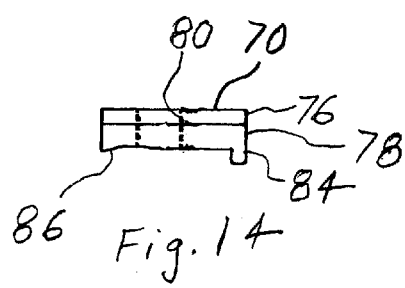
FIG. 14 is a right side view of the clamp illustrated in FIG. 13.

As heretofore stated, the apparatus of the invention is intended to be secured to the toolholder, as in toolholder 60, by a clamp, such as clamp 70. One example of a suitable clamp 70 is illustrated in FIGS. 13 and 14, and comprises an integral body having a center portion 78, an aperture 80 adapted to receive a fastener, such as a machine screw 82 (FIGS. 1 and 2), to bolt clamp 70 to the support block 72 or insert support head 64. Clamp 70 further includes a fulcrum portion 84 and a finger portion 86 which extends from one side of the center portion 78 to the other. Support block 72 has a slot 88 configured to receive fulcrum portion 84 of clamp 70, as shown in FIGS. 1 and 2. Similarly, head 64 has a shoulder 90 which is configured to receive fulcrum portion 84 of clamp 70 as shown in FIGS. 11 and 12.

Preferably, inclined portion 30 of top surface 22 is inclined downwardly at an acute angle from the perpendicular of first side 18, i.e. from portion 36. More preferably, inclined portion 30 is inclined downwardly at an angle of less than 30 degrees, and most preferably at an angle of about 15 degrees. The finger portion 86 of clamp 70 is inclined downwardly from the horizontal at an acute angle, preferably at approximately the same angle as the inclined portion 30 of the top surface of the insert.

When the clamp 70 is fastened by means of machine screw 82, the center portion 78 of body of clamp 70 acts as a lever with fulcrum portion 84 being forced into slot 88 and against the support block 72 or onto shoulder 90 of the insert support head 64, and the lever force being applied to finger portion 86 against the inclined portion 30 of insert 10. In this manner insert 10 is securely held in the nest or pocket 66 of the toolholder to resist forces exerted by the workpiece, particularly during turning and especially during turning while traversing the workpiece in the direction toward the vertical wall of the nest or pocket 66 as viewed from the insert.

While a particular embodiment of the grooving and turning insert of the invention has been shown and described, it will be appreciated by those skilled in the art that changes and modifications may be made thereto without departing from the invention in its broader aspects and as set forth in the following claims.

What is claimed is:

1. A product adapted for use with a toolholder having a pocket therefor in connection with a machine tool for grooving and turning, comprising a body having:
    a. first and second sides which are generally parallel and opposite each other;
    b. first and second ends, said first and second sides extending from adjacent said first end to said second end; and
    c. top and bottom surfaces extending continuously from adjacent said first end to said second end and from said first side to said second side, said top surface having an uninterrupted planar surface extending continuously from adjacent said first end to said second end and inclined downwardly from the perpendicular of the top edge of the first side to said second side, and said bottom surface having an uninterrupted planar surface extending continuously from adjacent said first end to said second end and inclined upwardly from the perpendicular of the bottom edge of the first side to said second side; wherein both said inclined surfaces are adapted to be utilized simultaneously for clamping said product within and to the pocket of the toolholder.

2. The product of claim 1, wherein said top surface has a second uninterrupted planar surface extending continuously from adjacent said first end to said second end perpendicularly from the top edge of said first side toward said second side, and said inclined first uninterrupted planar surface of said top surface extending downwardly from second uninterrupted planar surface to said second side at an acute angle with respect to said second uninterrupted planar surface of said top surface.

3. The product of claim 1, wherein said bottom surface has a second uninterrupted planar surface extending continuously from adjacent said first end to said second end perpendicularly from the bottom edge of said first side toward said second side, and said inclined first uninterrupted planar surface of said bottom surface extending upwardly from said second uninterrupted planar surface to said second side at an acute angle with respect to said second uninterrupted planar surface of said bottom surface.

4. The product of claim 1, wherein said top surface has a second uninterrupted planar surface extending continuously from adjacent said first end to said second end perpendicularly from the top edge of said first side toward said second side, and said inclined first uninterrupted planar surface of said top surface extending from second uninterrupted planar surface downwardly to said second side at an acute angle with respect to said second uninterrupted planar surface of said top surface, and wherein said bottom surface has a second uninterrupted planar surface continuously extending from adjacent said first end to said second end perpendicularly from the bottom edge of said first side toward said second side, and said inclined uninterrupted planar surface of said bottom surface extending upwardly from second uninterrupted planar surface of the bottom surface to said second side at an acute angle with respect to second uninterrupted planar surface of said bottom surface.

5. The product of claim 1, wherein said first end has generally parallel walls extending from said body and has a polygonal cross-section, said first end adapted for being formed into an insert portion.

6. The product of claim 5, wherein said first end has a portion extending transversely outwardly of the body beyond said second side.

7. The product of claim 5, wherein said top surface has a second uninterrupted planar surface extending continuously from adjacent said first end to said second end perpendicularly from the top edge of said first side toward said second side, and said inclined uninterrupted planar surface of said top surface extending downwardly from said second uninterrupted planar surface to said second side at an acute angle with respect to said second uninterrupted planar surface of said top surface.

8. The product of claim 7, wherein said bottom surface has a second uninterrupted planar surface extending continuously from adjacent said first end to said second end perpendicularly from the bottom edge of said first side toward said second side, and said inclined uninterrupted planar surface of said bottom surface extending upwardly from said second uninterrupted planar surface of the bottom surface to said second side at an acute angle with respect to said second uninterrupted planar surface of said bottom surface.

9. The product of claim 8, wherein said first end has a portion extending transversely outwardly of the body beyond said second side.

10. The product of claim 1, wherein said first end extends from said body and is a cutting portion of an insert.

11. The product of claim 10, wherein said top surface has a second uninterrupted planar surface extending continuously from adjacent said first end to said second end perpendicularly from the top edge of said first side toward said second side, and said inclined uninterrupted planar surface of said top surface extending downwardly from said second uninterrupted planar surface of the top surface to said second side at an acute angle with respect to second uninterrupted planar surface of said top surface.

12. The product of claim 11, wherein said bottom surface has a second uninterrupted planar surface extending continuously from adjacent said first end to said second end perpendicularly from the bottom edge of said first side toward said second side, and said inclined uninterrupted planar surface of said bottom surface extending upwardly from said second uninterrupted planar surface to said second side at an acute angle with respect to said second uninterrupted planar surface of said bottom surface.

13. The product of claim 12, wherein said first end has a portion extending transversely outwardly of the body beyond the second side.

14. A product adapted for use with a machine tool for grooving and turning, comprising a body having:
   a. first and second sides which are generally parallel and opposite each other;
   b. first and second ends, said first and second sides extending from adjacent said first end to said second end; and
   c. top and bottom surfaces extending continuously from adjacent said first end to said second end and from said first side to said second side, said top surface having an uninterrupted planar surface extending continuously from adjacent said first end to said second end and inclined downwardly to said second side, and said bottom surface having an uninterrupted planar surface extending continuously from adjacent said first end to said second end and inclined upwardly to said second side; wherein both said inclined surfaces are adapted to be utilized simultaneously for clamping said product within and to the pocket of the toolholder;
   d. said top surface having a second uninterrupted planar surface extending continuously from adjacent said first end to said second end perpendicularly from the top edge of said first side toward said second side, and said inclined uninterrupted planar surface of said top surface extending downwardly from said second uninterrupted planar surface to said second side at an acute angle with respect to said second uninterrupted planar surface of said top surface; and
   e. said bottom surface having a second uninterrupted planar surface extending continuously from adjacent said first end to said second end perpendicularly from the bottom edge of said first side toward said second side, and said inclined uninterrupted planar surface of said bottom surface extending upwardly from said second uninterrupted planar surface to said second side at an acute angle with respect to said second uninterrupted planar surface of said bottom surface.

15. The product of claim 14, wherein said first end has a portion extending transversely outwardly of the body beyond the second side.

16. An insert adapted for use with a toolholder having a pocket therefor in connection with a machine tool for grooving and turning, comprising:
   a. a body having:
      (i) first and second sides which are generally parallel and opposite each other;
      (ii) first and second ends, said first and second sides extending from adjacent said first end to said second end; and
      (iii) top and bottom surfaces extending continuously from adjacent said first end to said second end and from said first side to said second side, said top surface having an uninterrupted planar surface extending continuously from adjacent said first end to said second end inclined downwardly from the perpendicular of the top of the first side to said second side, and said bottom surface having an uninterrupted planar surface extending continuously from adjacent said first end to said second end inclined upwardly from the perpendicular of the bottom of the first side to said second side; wherein both said inclined surfaces are adapted to be utilized simultaneously for clamping said insert within and to the pocket of the toolholder; and
   b. said first end comprising an insert portion adapted for grooving and turning.

17. The insert of claim 16, wherein said top surface has a second uninterrupted planar surface extending continuously from adjacent said first end to said second end perpendicularly from the top edge of said first side toward said second side, and said inclined uninterrupted planar surface of said top surface extending from said second uninterrupted planar surface downwardly to said second side at an acute angle with respect to said second uninterrupted planar surface of said top surface; and said bottom surface has a second uninterrupted planar surface extending continuously from adjacent said first end to said second end perpendicularly from the bottom edge of said first side toward said second side, and said inclined uninterrupted planar surface of said bottom surface extending upwardly from said second uninterrupted planar surface of said bottom surface to said second side at an acute angle with respect to second uninterrupted planar surface of said bottom surface.

18. The insert of claim 17, wherein said first end has a portion extending transversely outwardly of the body beyond the second side.

19. The insert of claim 16, wherein said first end is laterally offset in one direction from the first and second sides of the body of the insert.

20. A product adapted for use with a toolholder having a pocket therefor in connection with a machine tool for grooving and turning, comprising a body having:
   a. first and second sides which are generally opposite each other, the first side being generally planar;
   b. first and second ends, said first and second sides extending from adjacent said first end to said second end; and
   c. top and bottom surfaces extending continuously from adjacent said first end to said second end and from said first side to said second side, said top surface having an uninterrupted planar surface extending continuously from adjacent said first end to said second end and inclined downwardly from the perpendicular of the top edge of the first side to said second side, and said bottom surface having an uninterrupted planar surface extending continuously from adjacent said first end to said second end and inclined upwardly from the perpendicular of the bottom edge of the first side to said second side; wherein said both inclined surfaces are adapted to be utilized simultaneously for clamping said product within and to the pocket of the toolholder.

21. The product of claim 20, wherein said top surface has a second uninterrupted planar surface extending continuously from adjacent said first end to said second end perpendicularly from the top edge of said first side toward said second side, and said inclined uninterrupted planar surface of said top surface extending downwardly from said second uninterrupted planar surface to said second side at an acute angle with respect to second uninterrupted planar surface of said top surface.

22. The product of claim 20, wherein said bottom surface has a second uninterrupted planar surface extending continuously from adjacent said first end to said second end perpendicularly from the bottom edge of said first side toward said second side, and said inclined uninterrupted planar surface of said bottom surface extending upwardly from said second uninterrupted planar surface to said second side at an acute angle with respect to second uninterrupted planar surface of said bottom surface.

23. The product of claim 20, wherein said top surface has a second uninterrupted planar surface extending continuously from adjacent said first end to said second end perpendicularly from the top edge of said first side toward said second side, and said inclined uninterrupted planar surface of said top surface extending from said second uninterrupted planar surface downwardly to said second side at an acute angle with respect to said second uninterrupted planar surface of said top surface, and wherein said bottom surface has a second uninterrupted planar surface continuously extending from adjacent said first end to said second end perpendicularly from the bottom edge of said first side toward said second side, and said inclined uninterrupted planar surface of said bottom surface extending upwardly from said second uninterrupted planar surface of the bottom surface to said second side at an acute angle with respect to second uninterrupted planar surface of said bottom surface.

24. The product of claim 20, wherein said first end has generally parallel walls extending from said body and has a polygonal cross-section, said first end adapted for being formed into an insert portion.

25. The product of claim 24, wherein said first end has a portion extending transversely outwardly of the body beyond said second side.

26. A product adapted for use with a toolholder having a pocket therefor in connection with a machine tool for grooving and turning, comprising a body having:

a. first and second sides which are generally opposite each other, the first side being generally planar;

b. first and second ends, said first and second sides extending from adjacent said first end to said second end; and c. top and bottom surfaces extending continuously from adjacent said first end to said second end and from said first side to said second side, said top surface having an uninterrupted planar surface extending continuously from adjacent said first end to said second end and inclined downwardly to said second side, and said bottom surface having an uninterrupted planar surface extending continuously from adjacent said first end to said second end and inclined upwardly to said second side; wherein both said inclined surfaces are adapted to be utilized simultaneously for clamping said product within and to the pocket of the toolholder;

d. said top surface having a second uninterrupted planar surface extending continuously from adjacent said first end to said second end perpendicularly from the top edge of said first side toward said second side, and said inclined uninterrupted planar surface of said top surface extending downwardly from said second uninterrupted planar surface to said second side at an acute angle with respect to said second uninterrupted planar surface of said top surface; and e. said bottom surface having a second uninterrupted planar surface extending continuously from adjacent said first end to said second end perpendicularly from the bottom edge of said first side toward said second side, and said inclined uninterrupted planar surface of said bottom surface extending upwardly from second portion to said second side at an acute angle with respect to said second uninterrupted planar surface of said bottom surface.

27. The product of claim 26, wherein said first end has a portion extending transversely outwardly of the body beyond the second side.

28. An insert adapted for use with a toolholder having a pocket therefor in connection with a machine tool for grooving and turning, comprising:

a. a body having:
    (i) first and second sides which are generally opposite each other, the first side being generally planar;
    (ii) first and second ends, said first and second sides extending from adjacent said first end to said second end; and
    (iii) top and bottom surfaces extending continuously from adjacent said first end to said second end and from said first side to said second side, said top surface having an uninterrupted planar surface extending continuously from adjacent said first end to said second end and inclined downwardly from the perpendicular of the top of the first side to said second side, and said bottom surface having an uninterrupted planar surface extending continuously from adjacent said first end to said second end and inclined upwardly from the perpendicular of the bottom of the first side to said second side; wherein both said inclined surfaces are adapted to be utilized simultaneously for clamping said product within and to the pocket of the toolholder; and b. said first end comprising an insert portion adapted for grooving and turning.

29. The insert of claim 28, wherein said top surface has a second uninterrupted planar surface extending continuously from adjacent said first end to said second end perpendicularly from the top edge of said first side toward said second side, and said inclined uninterrupted planar surface of said top surface extending from said second uninterrupted planar surface downwardly to said second side at an acute angle with respect to said second uninterrupted planar surface of said top surface; and said bottom surface has a second uninterrupted planar surface extending continuously from adjacent said first end to said second end perpendicularly from the bottom edge of said first side toward said second side, and said inclined uninterrupted planar surface of said bottom surface extending upwardly from said second uninterrupted planar surface of said bottom surface to said second side at an acute angle with respect to second uninterrupted planar surface of said bottom surface.

30. The insert of claim 29, wherein said first end has a portion extending transversely outwardly of the body beyond the second side.

31. The insert of claim 28, wherein said first end is laterally offset in one direction from the first and second sides of the body of the insert.

\* \* \* \* \*